(12) United States Patent
Paek

(10) Patent No.: US 7,181,983 B2
(45) Date of Patent: Feb. 27, 2007

(54) TORQUE SENSOR MALFUNCTION DIAGNOSTIC SYSTEM

(75) Inventor: Seung-Ho Paek, Uijeongbu-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/032,111

(22) Filed: Jan. 11, 2005

(65) Prior Publication Data

US 2006/0107763 A1    May 25, 2006

(30) Foreign Application Priority Data

Nov. 16, 2004   (KR) ...................... 10-2004-0093468

(51) Int. Cl.
*G01L 3/02*        (2006.01)
(52) U.S. Cl. .................. 73/862.193; 73/862.326; 73/862.328; 73/862.331; 73/862.332
(58) Field of Classification Search .......... 73/862.193, 73/862.326, 862.328, 862.331, 862.333
See application file for complete search history.

(56) References Cited

U.S. PATENT DOCUMENTS

| | | | |
|---|---|---|---|
| 5,406,834 A * | 4/1995 | Taniguchi | 73/118.1 |
| 5,497,667 A * | 3/1996 | Nakaura | 73/862.328 |
| 5,811,695 A * | 9/1998 | Satoh et al. | 73/862.331 |
| 6,704,665 B2 * | 3/2004 | Ueno | 702/41 |
| 7,061,229 B2 * | 6/2006 | Townsend et al. | 324/207.12 |
| 2003/0040872 A1 * | 2/2003 | Ueno | 702/41 |

FOREIGN PATENT DOCUMENTS

JP           8-68703        3/1996

OTHER PUBLICATIONS

English Language Abstract of JP 8-68703.
U.S. Appl. No. 10/975,334, to Whang, filed Oct. 29, 2004.

* cited by examiner

*Primary Examiner*—Edward Lefkowitz
*Assistant Examiner*—Freddie Kirkland, III
(74) *Attorney, Agent, or Firm*—Greenblum & Bernstein, P.L.C.

(57) ABSTRACT

A system to diagnose a malfunction of a torque sensor in a vehicle steering system includes a voltage difference generator that outputs a voltage difference by comparing a voltage of a contact part between a temperature correcting coil and a torque detecting coil in a torque sensor for a steering system and an offset voltage generated from an offset voltage generator, a malfunction determining part that determines a malfunction by comparing a reference voltage and an output voltage of said voltage difference generator, and a controller that executes a neutral steering when a malfunction is determined in said malfunction determining part.

17 Claims, 2 Drawing Sheets

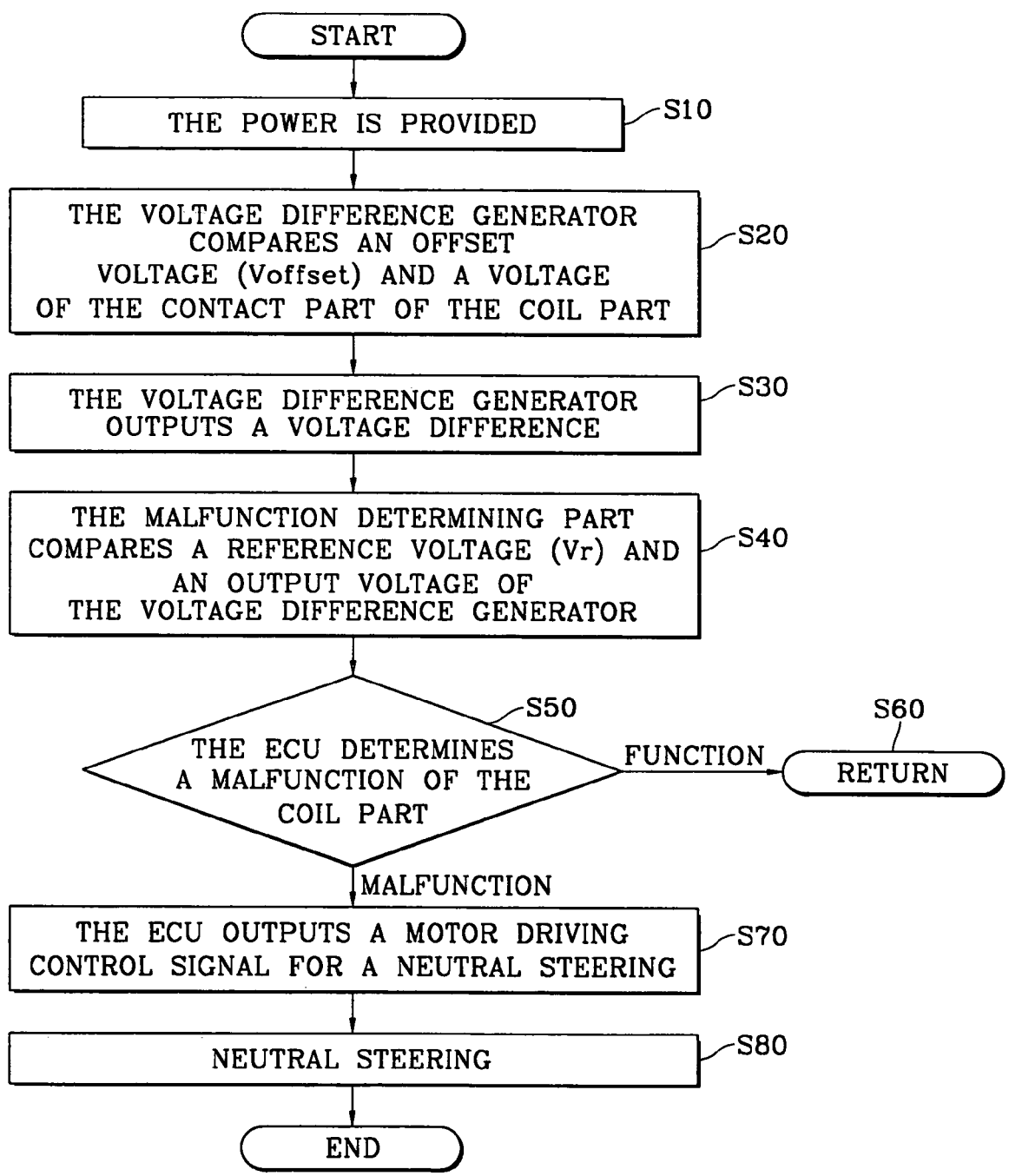

TORQUE SENSOR MALFUNCTION DIAGNOSTIC SYSTEM

CROSS-REFERENCE TO RELATED APPLICATIONS

The present application is based on, and claims priority from, Korean Application Serial Number 10-2004-0093468, filed on Nov. 16, 2004, the disclosure of which is hereby incorporated by reference herein in its entirety.

FIELD OF THE INVENTION

The present invention relates to a system for diagnosing a malfunction of a torque sensor for a vehicle steering system and a method thereof adapted to diagnose whether a coil part of the torque sensor or the like of the steering system malfunctions due to a disconnection, short circuit or the like.

BACKGROUND OF THE INVENTION

Generally, an Electronic Control Unit (ECU) of an Electrical Power Steering (EPS) system controls the steering of a vehicle by detecting steering torque according to the manipulation of a steering wheel of a driver through a torque sensor.

A coil part of the torque sensor is constituted by a temperature correcting coil and a torque detecting coil in which a circular insulated plastic bobbin is wound by a copper wire and covered with a bobbin housing made from a sintered body cover having a magnetic property. However, the copper wire of the coil is susceptible to damage during a coil winding process, wire brazing, or coupling with the bobbin housing.

SUMMARY OF THE INVENTION

Embodiments of the present invention are provided to diagnose by using a voltage comparing means whether a coil part (temperature correcting coil, torque detecting coil) of a torque sensor for a steering system malfunctions due to a disconnection, short circuit or the like.

A system to diagnose a malfunction of a torque sensor in a steering system includes a voltage difference generator that outputs a voltage difference by comparing a voltage of a contact part between a temperature correcting coil and a torque detecting coil in a torque sensor for a steering system and an offset voltage generated from an offset voltage generator. A malfunction determining part determines a malfunction by comparing a reference voltage and an output voltage of the voltage difference generator. A controller executes a neutral steering when a malfunction is determined in the malfunction determining part.

A method for diagnosing a malfunction of a torque sensor in a steering system includes providing power to a torque sensor, outputting a voltage difference by comparing an offset voltage and a voltage of a contact part between a temperature correcting coil and a torque detecting coil that vary according to a manipulation of a steering wheel of a driver, outputting a malfunction signal if the voltage difference outputted from the voltage difference generator is greater than a reference voltage, and executing a neutral steering by outputting a motor driving control signal if a malfunction signal is inputted from the malfunction determining part.

BRIEF DESCRIPTION OF THE DRAWINGS

For a better understanding of the nature and objects of the present invention, reference should be made to the following detailed description with the accompanying drawings, in which:

FIG. 2 is a flowchart depicting a method of diagnosing a malfunction of a torque sensor for a steering system according to an embodiment of the present invention.

DETAILED DESCRIPTION OF THE PREFERRED EMBODIMENTS

Figure 1:
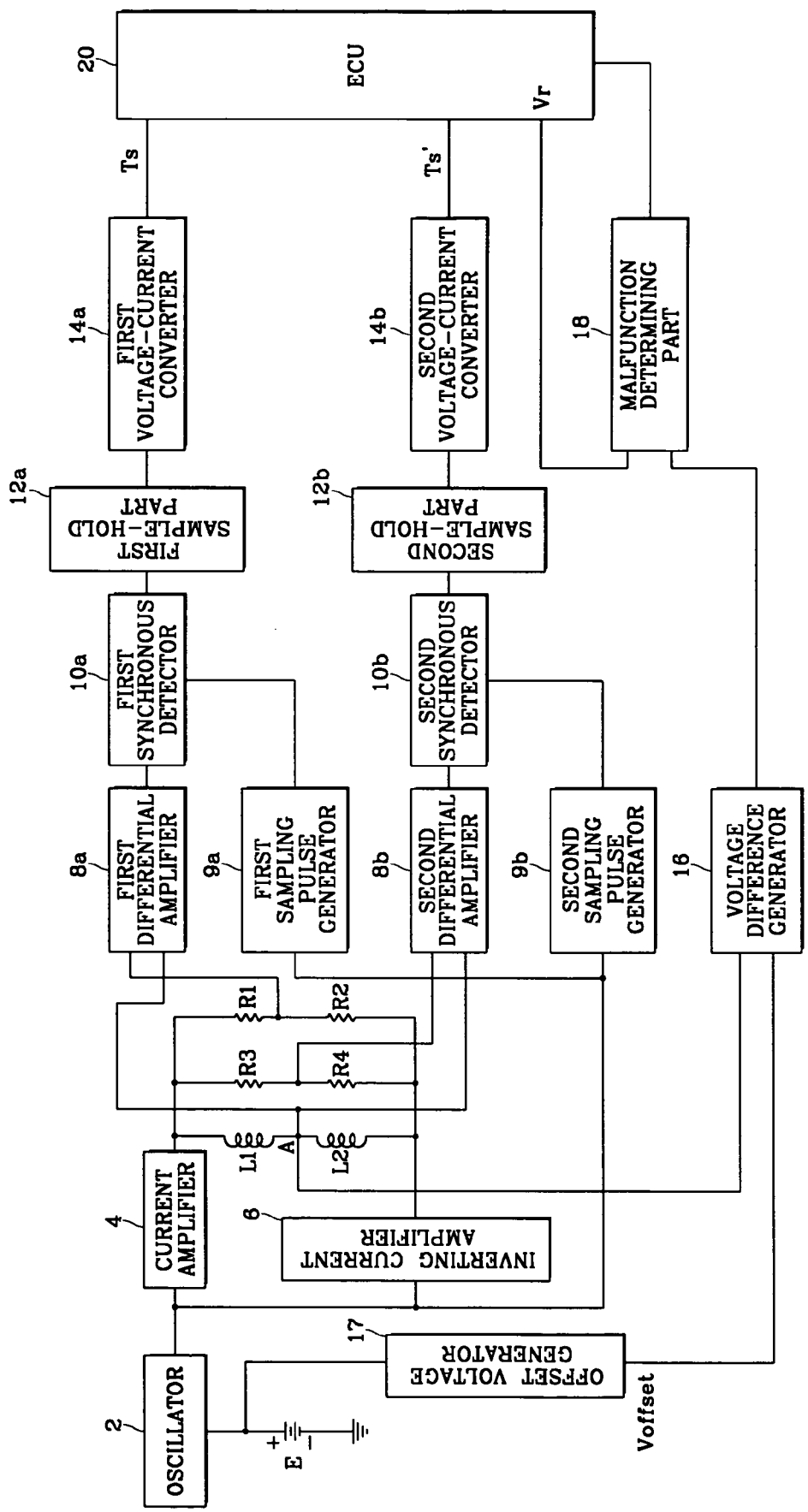
FIG. 1 is a block diagram illustrating a system of diagnosing a malfunction of a torque sensor for a steering system according to an embodiment of the present invention.

Referring now to FIG. 1, an embodiment of the present invention includes a voltage difference generator 16 and a malfunction determining part 18 to diagnose a malfunction of a torque sensor for an Electrical Power Steering (EPS) system and, particularly, to diagnose a disconnection, short circuit or the like in a coil part (temperature correcting coil and torque detecting coil).

An output terminal of an oscillator 2, which oscillates by a power provision from a power source (E), is connected to input terminals of a current amplifier 4, inverting current amplifier 6 and first and second sampling pulse generator 9a and 9b, respectively. A series circuit of a temperature correcting coil (L1) and torque detecting coil (L2) is connected between an output terminal of current amplifier 4 and an output terminal of inverting current amplifier 6.

The series circuit of temperature correcting coil (L1) and torque detecting coil (L2) is connected in parallel to a main series circuit of first and second resistance (R1, R2) and a fail-safe series circuit of third and fourth resistance (R3, R4).

The contact part of temperature correcting coil (L1) and torque detecting coil (L2) is connected to input terminals of a first and second differential amplifier 8a, 8b and voltage difference generator 16.

The contact part of first and second resistance (R1, R2) is connected to another input terminal of first differential amplifier 8a. The contact part of third and fourth resistance (R3, R4) is connected to another input terminal of second differential amplifier 8b.

Output terminals of first and second differential amplifier 8a, 8b are connected to input terminals of a first and second synchronous detector 10a, 10b, respectively. A pulse output terminals of first and second sampling pulse generator 9a and 9b are connected to sampling pulse input terminals of first and second synchronous detector 10a and 10b, respectively.

Output terminals of first and second synchronous detector 10a, 10b are connected to input terminals of a first and second sample-hold part 12a and 12b. The output terminals of first and second sample-hold part 12a and 12b are connected to input terminals of a first and second voltage-current converter 14a and 14b.

First voltage-current converter 14a outputs a torque detecting signal (Ts) while second voltage-current converter 14b outputs a fail-safe torque detecting signal (Ts').

Power source (E) is in connection with an offset voltage generator 17 that generates an offset voltage ($V_{offset}$) to input into voltage difference generator 16. The offset voltage ($V_{offset}$) is used in voltage difference generator 16 as well as in oscillator 2, current amplifier 4, first and second differential amplifier 8a, 8b, first and second sample-hold part 12a and 12b, and the like.

Voltage difference generator 16 receives a voltage of the contact part (A) between temperature correcting coil (L1) and torque detecting coil (L2) of a torque sensor, together with, an offset voltage ($V_{offset}$) generated from offset voltage generator 17. Then, voltage difference generator 16 outputs a voltage difference of the above two signals into malfunction determining part 18.

Malfunction determining part 18 receives the voltage difference outputted from voltage difference generator 16 and a reference voltage (Vr) applied from a controller (ECU) 20. Malfunction determining part 18 then compares the above two signals and inputs a malfunction signal into controller 20 if the voltage difference is greater than reference voltage (Vr). If the voltage difference is smaller than reference voltage (Vr), malfunction determining part 18 inputs a function signal to controller 20.

If a malfunction signal is inputted from malfunction determining part 18, controller 20 determines that the coil part (temperature correcting coil (L1) and torque detecting coil (L2)) is in malfunction.

Voltage difference generator 16 according to the embodiment of the present invention is a means for detecting whether a coil part is in disconnection, short circuit, or the like by sensing any defect in a coil part (temperature correcting coil (L1) and torque detecting coil (L2)), any defect in a wire connected to the coil part, any variation of the contact resistance of a connector connected to the wire, and the like. When a disconnection, short circuit, or a large variation of a contact resistance occurs in the coil part, the voltage of contact part (A) between temperature correcting coil (L1) and torque detecting coil (L2) is close to 0V or not less than 5V.

Malfunction determining part 18 receives the voltage difference signal from voltage difference generator 16 and reference voltage signal (Vr) from controller 20, and then compares the voltage signals. If a disconnection, short circuit, or the like is generated in the coil part, the voltage outputted from voltage difference generator 16 will be greater than reference voltage (Vr) from controller 20. If the voltage difference outputted from voltage difference generator 16 is greater than reference voltage (Vr), controller 20 determines a malfunction of the coil part due to a disconnection, short circuit or the like.

The operation of a sensor to detect a torque signal (Ts or Ts') will be omitted as it is clear to one who works in this field.

Now, the operation of the embodiment of the present invention will be described in detail with reference to FIGS. 1 and 2.

The power is provided from power source (E) to a torque sensor (step 10). Voltage difference generator 16 receives a voltage of contact part (A) between temperature correcting coil (L1) and torque detecting coil (L2), which vary according to the manipulation of a driver's steering wheel, and an offset voltage ($V_{offset}$) applied from offset voltage generator 17. Then, voltage difference generator 16 compares the two voltage signals (step 20).

After comparing the above two voltage signals, voltage difference generator 16 outputs a voltage difference of the two signals for a first diagnosis of malfunction (disconnection, short circuit, or the like) in the coil part (step 30).

The voltage difference outputted through voltage difference generator 16 is inputted into malfunction determining part 18 with reference voltage (Vr) applied from controller 20. Malfunction determining part 18 compares the inputted two voltage signals, and outputs a malfunction signal if the voltage difference is greater than reference voltage (Vr) and outputs a function signal if the voltage difference is smaller than reference voltage (Vr) (step 40).

Controller 20 determines a malfunction according to a signal inputted from malfunction determining part 18 into controller 20 (step 50).

In step 50, controller 20 determines whether the coil part is in disconnection, short circuit, or the like. Provided that a malfunction signal is inputted into controller 20, controller 20 determines that the coil part is disconnected, in a short circuit, or the like.

If the coil part is determined to malfunction in step 50, controller 20 outputs a motor driving control signal for a neutral steering of the vehicle (step 70). The neutral steering of the vehicle is performed without regard to the torque signal (Ts, Ts') inputted to controller 20 (step 80). Thus, an accident due to a sudden steering caused by a disconnection, short circuit, or the like of the coil part of the torque sensor regardless of a driver's intention is prevented.

In case the output (Ts, Ts') of the torque sensor is transmitted to controller 20 while a wire, coil part or the like is in disconnection, short circuit, or the like, controller 20 outputs a relevant large steering current control signal to operate a motor. This causes a loss of steering stability by a sudden steering. In particular, when the vehicle is in forward motion, if the vehicle is being steered to the left or right, regardless of a driver's intention, the possibility of a vehicle accident increases.

In order to diagnose the operation state of a torque sensor for a vehicle steering system, an offset voltage ($V_{offset}$) and a voltage of a contact part between temperature correcting coil (L1) and torque detecting coil (L2) are compared in voltage difference generator 16. Malfunction determining part 18 compares an output voltage of voltage difference generator 16 with reference voltage (Vr) applied from controller 20 to determine whether temperature correcting coil (L1) and torque detecting coil (L2) are abnormal. Then, controller 20 performs a neutral steering to prevent a sudden steering due to a malfunction of the torque sensor.

The technical concept is not limited to the embodiment of the present invention, however, should be determined by a logical interpretation within the scope of claims of the present invention.

As apparent from the foregoing, there is an advantage in that a sudden steering is prevented by a precise diagnosis of the coil part of the torque sensor according to the system and method of the present invention, thereby obtaining a driving stability of the vehicle.

What is claimed is:

1. A system to diagnose a malfunction of a torque sensor for use in a vehicle steering system, comprising:
   a voltage difference generator that outputs a voltage difference by comparing a voltage of a contact part between a temperature correcting coil and a torque detecting coil in a torque sensor for a steering system and an offset voltage generated from an offset voltage generator;
   a malfunction determiner that determines a malfunction by comparing a reference voltage and an output voltage of said voltage difference generator; and
   a controller that executes a neutral steering when a malfunction is determined in said malfunction determiner.

2. The system according to claim 1, further comprising:
   a first differential amplifier and a second differential amplifier coupled to said contact between said temperature correcting coil and said torque detecting coil.

3. The system according to claim 2, wherein said first differential amplifier is coupled to the contact between a first resistor and a second resistor.

4. The system according to claim 3, wherein said second differential amplifier is coupled to the contact between a third resistor and a fourth resistor.

5. The system according to claim 2, further comprising:
a contact between a first resistor and a second resistor coupled to said first differential amplifier;
a second contact between a third resistor and a fourth resistor coupled to said second differential amplifier;
a first synchronous detector coupled to said first differential amplifier; and
a second synchronous detector coupled to said second differential amplifier.

6. The system according to claim 5, further comprising:
a first sample-hold circuit coupled to said first synchronous detector; and
a second sample-hold circuit coupled to said second synchronous detector.

7. The system according to claim 6, further comprising:
a first voltage-current converter coupled to said first sample-hold circuit; and
a second voltage-current converter coupled to said second sample-hold circuit.

8. The system according to claim 7, wherein said controller is coupled to said first voltage-current converter, to said second voltage-current converter and to said malfunction determiner.

9. A method to diagnose a malfunction of a torque sensor in a vehicle steering system, comprising:
providing power to a torque sensor;
outputting a voltage difference by comparing an offset voltage and a voltage of a contact part between a temperature correcting coil and a torque detecting coil that vary according to a manipulation of a steering wheel of the vehicle;
outputting a malfunction signal when the voltage difference output is greater than a reference voltage; and
executing a neutral steering by outputting a motor driving control signal when the malfunction signal is output.

10. A system to diagnose a malfunction of a torque sensor, comprising:
a voltage difference generator that outputs a voltage by comparing a voltage of a contact between a temperature correcting coil and a torque detecting coil in a torque sensor and an offset voltage generated from an offset voltage generator; and
a malfunction determiner that determines a malfunction by comparing a reference voltage and the output voltage of said voltage difference generator.

11. The system according to claim 10, further comprising:
a first differential amplifier and a second differential amplifier coupled to said contact between said temperature correcting coil and said torque detecting coil.

12. The system according to claim 11, wherein said first differential amplifier is coupled to the contact between a first resistor and a second resistor.

13. The system according to claim 12, wherein said second differential amplifier is coupled to the contact between a third resistor and a fourth resistor.

14. The system according to claim 11, further comprising:
a contact between a first resistor and a second resistor coupled to said first differential amplifier;
a second contact between a third resistor and a fourth resistor coupled to said second differential amplifier;
a first synchronous detector coupled to said first differential amplifier; and
a second synchronous detector coupled to said second differential amplifier.

15. The system according to claim 14, further comprising:
a first sample-hold circuit coupled to said first synchronous detector; and
a second sample-hold circuit coupled to said second synchronous detector.

16. The system according to claim 15, further comprising:
a first voltage-current converter coupled to said first sample-hold circuit; and
a second voltage-current converter coupled to said second sample-hold circuit.

17. The system according to claim 16, wherein said controller is coupled to said first voltage-current converter, to said second voltage-current converter and to said malfunction determiner.

* * * * *

UNITED STATES PATENT AND TRADEMARK OFFICE
CERTIFICATE OF CORRECTION

PATENT NO. : 7,181,983 B2 Page 1 of 1
APPLICATION NO. : 11/032111
DATED : February 27, 2007
INVENTOR(S) : S. Paek It is certified that error appears in the above-identified patent and that said Letters Patent is hereby corrected as shown below:

At column 5, line 31 of the printed patent, after "system," insert --the method--.

Signed and Sealed this

Twenty-seventh Day of May, 2008

JON W. DUDAS
*Director of the United States Patent and Trademark Office*